July 16, 1957 H. HURWITZ, JR., ET AL 2,799,642
NEUTRONIC REACTOR FUEL ELEMENT
Filed July 13, 1951 4 Sheets-Sheet 2

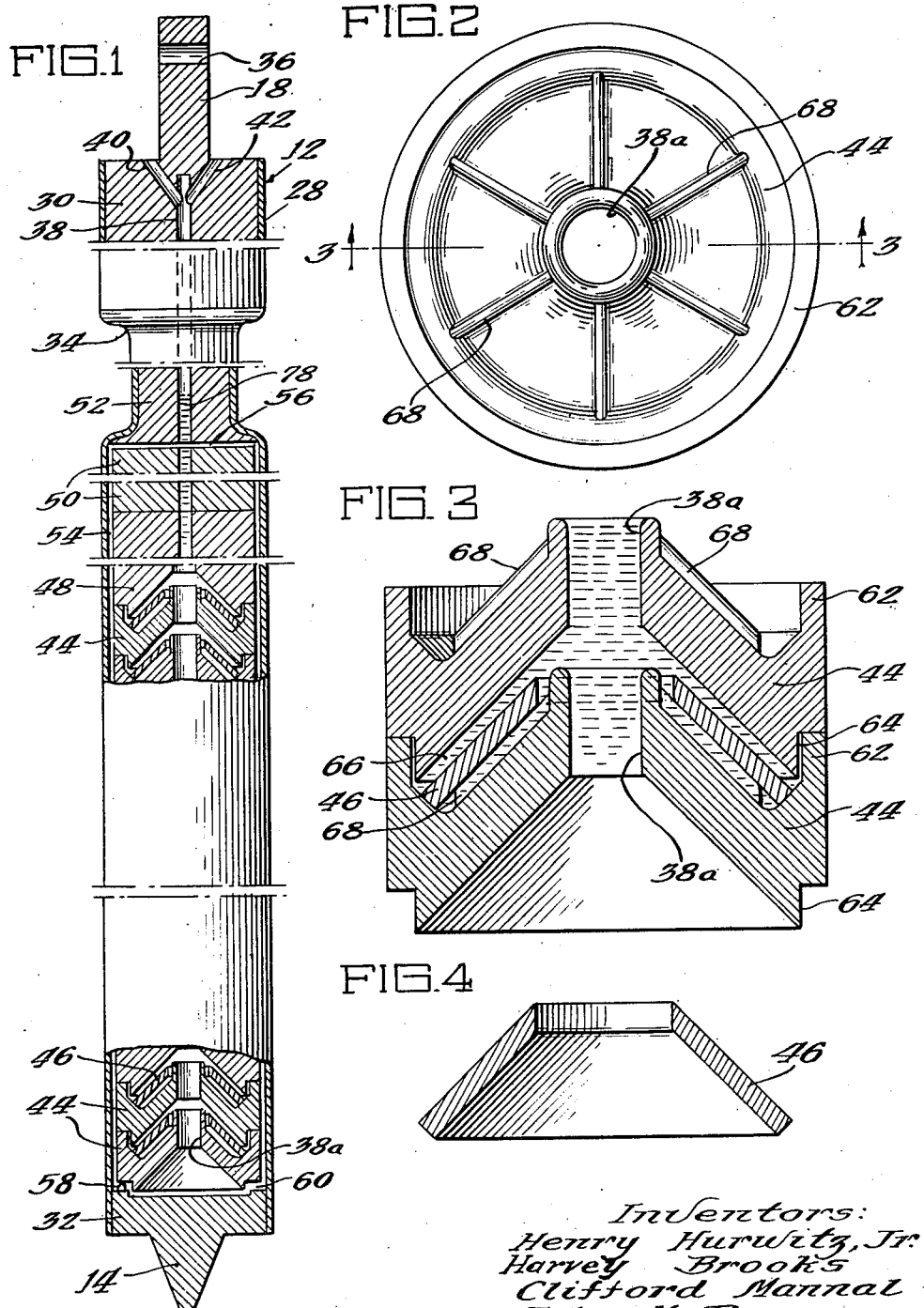

Inventors:
Henry Hurwitz, Jr.
Harvey Brooks
Clifford Mannal
John H. Payne
Emmeth A. Luebke
By: Roland A. Anderson
Attorney.

July 16, 1957  H. HURWITZ, JR., ET AL  2,799,642
NEUTRONIC REACTOR FUEL ELEMENT
Filed July 13, 1951  4 Sheets-Sheet 3
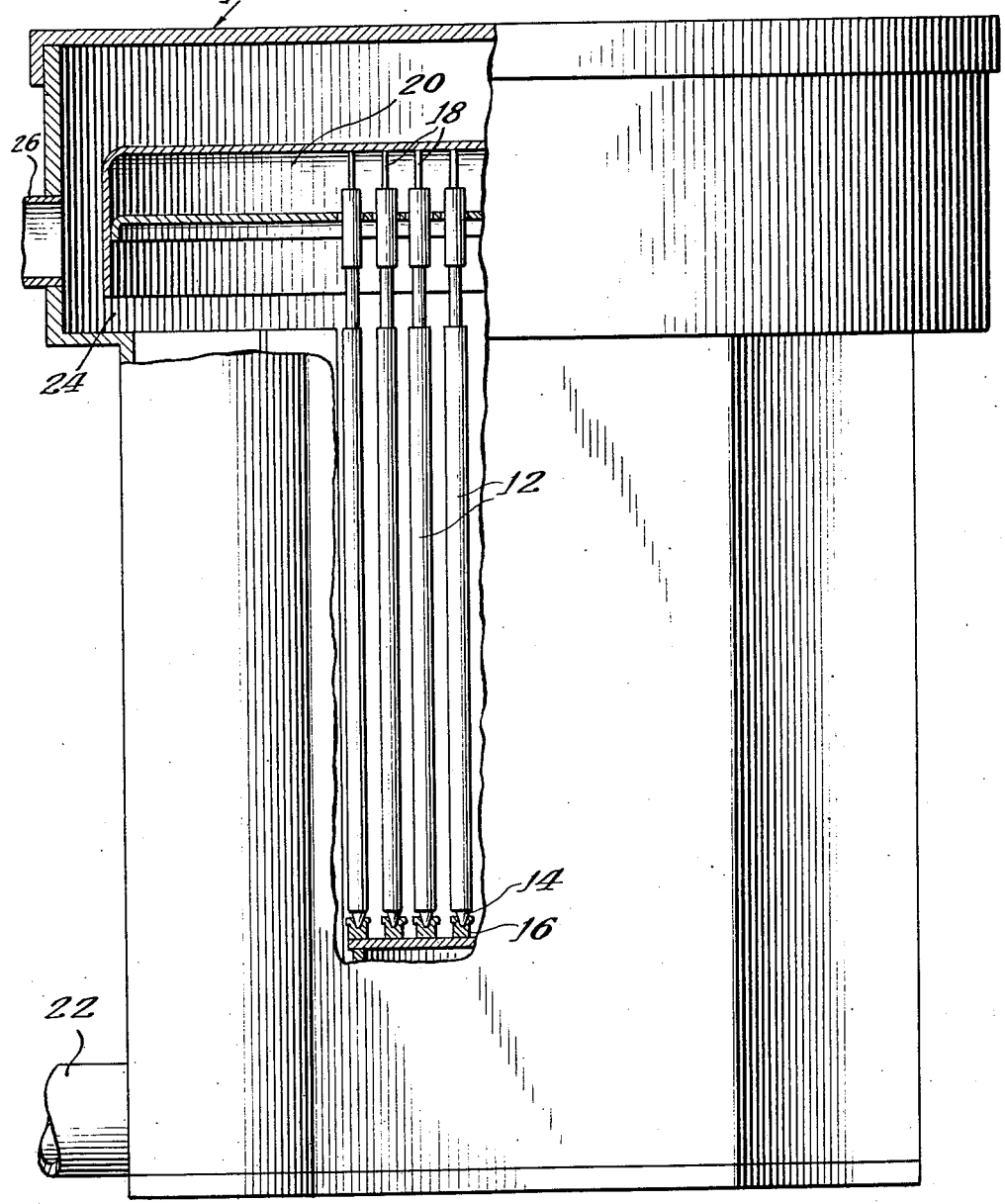
Inventors:
Henry Hurwitz, Jr.
Harvey Brooks
Clifford Mannal
John H. Payne
Emmeth A. Luebke
By: Roland A. Anderson
Attorney

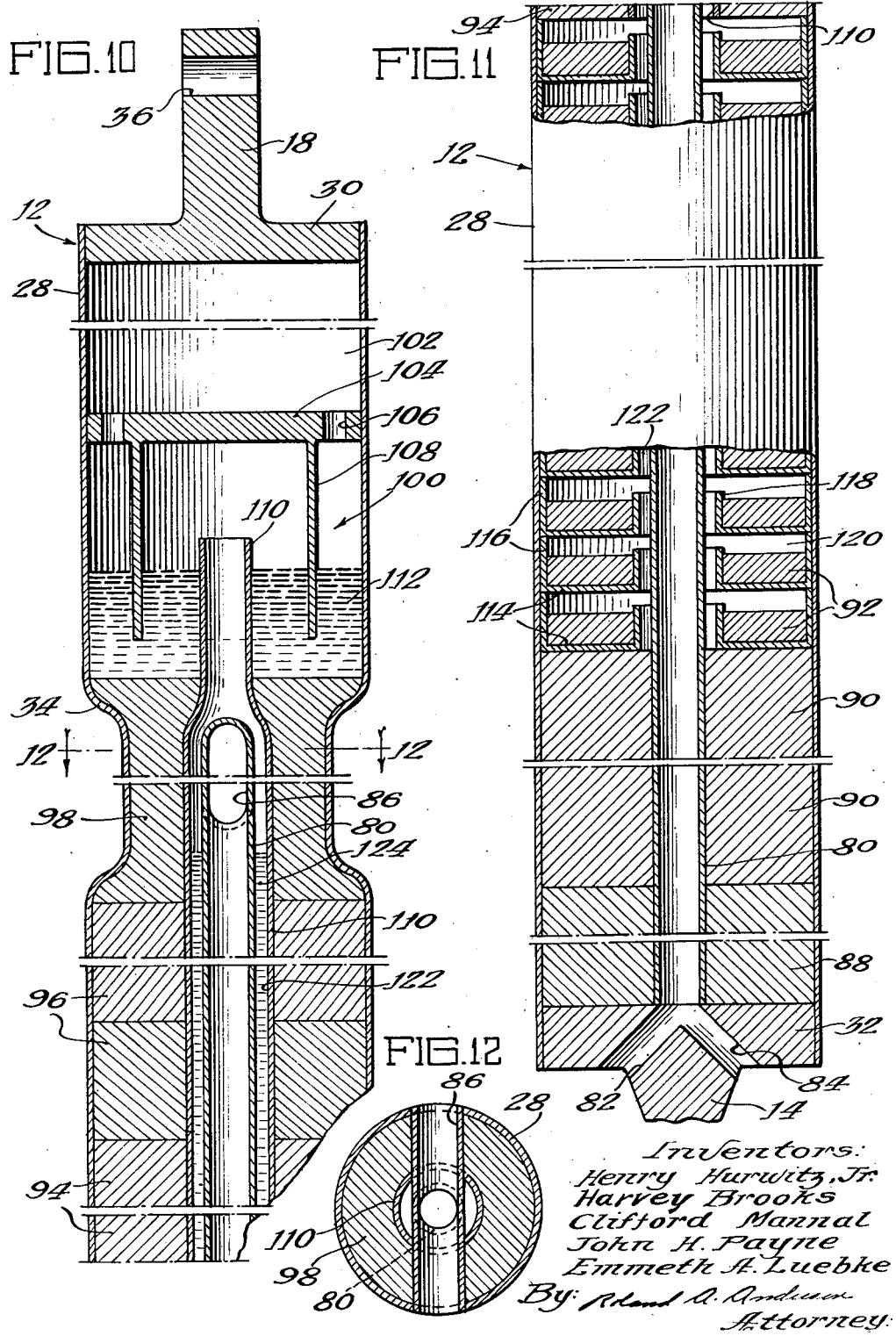

United States Patent Office 2,799,642
Patented July 16, 1957

2,799,642

NEUTRONIC REACTOR FUEL ELEMENT

Henry Hurwitz, Jr., Schenectady, N. Y., Harvey Brooks, Cambridge, Mass., and Clifford Mannal, Schenectady, John H. Payne, Ballston Spa, and Emmeth A. Luebke, Schenectady, N. Y., assignors to the United States of America as represented by the United States Atomic Energy Commission Application July 13, 1951, Serial No. 236,644

11 Claims. (Cl. 204—193.2)

This invention relates generally to fuel elements in a neutronic reactor. It pertains particularly to improvements in cooling and in escape of detrimental fission gases from the active portions of the element.

Since this invention is concerned with the structure of a fuel element itself and not with the operation of the particular reactor in which it functions, a detailed discussion of a reactor employing the present fuel element will not be made herein. Neutronic reactors are disclosed in Fermi et al. Patent 2,708,656, dated May 17, 1955, and the copending application of Walter H. Zinn, Serial No. 721,108, filed January 8, 1947.

Among the objects of this invention are: To provide substantially constant nuclear reactivity in any fuel element through subdivision of the active material into many small pieces supported independently by other material such as moderator; to permit the escape of the fission product gases which are evolved in too great volumes to permit adsorption or storage within the immediate vicinity of the active material in the fuel element; and to enclose a suitable amount of thermal neutron fissionable material within a chemically resistant, nonsoluble jacket sufficiently thin to afford good heat transfer and a minimum of neutron absorption, yet of sufficient thickness to retain the fission products and provide adequate mechanical strength. In order to achieve a practical design capable of furnishing large amounts of energy over an extended period of time, and without hazard, the requirements of the above objectives must be met.

Other objects of this invention will, in part, be obvious and appear hereinafter.

For a more complete understanding of the nature and scope of this invention, reference can be had to the following detailed description taken together with the accompanying drawings in which:

Figure 1 is an elevation view, partly in section, of one embodiment of a fuel element embodying the present invention;

Figure 2 is an enlarged plan view of a portion of the fuel element shown in Figure 3;

Figure 3 is an enlarged vertical sectional view of a portion of the fuel element, showing the manner in which the fissionable material is disposed within each fuel element, taken on the line 3—3 of Figure 2;

Figure 4 is an enlarged vertical sectional view of the fissionable wafer;

Figure 9 is an elevation view, partly in section, of a neutronic reactor;

Figure 10 is an enlarged vertical sectional view of the upper portion of another embodiment of the fuel element of this invention;

Figure 11 is an enlarged vertical sectional view, partly in elevation, of the lower portion of the fuel element shown in Figure 10; and Figure 12 is a horizontal sectional view, taken on the line 12—12 of Figure 10.

Figure 5:
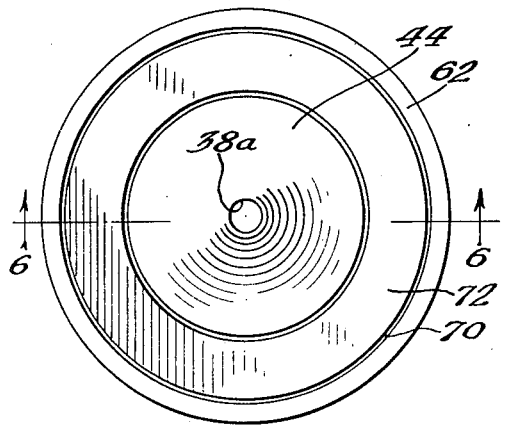
Figure 5 is an enlarged plan view of a second embodiment of the portion of the fuel element shown in Figure 2 and 3.

The proposed fuel element is elongated and is sustained vertically to promote the rise of fission product gases. While the horizontal cross section of the element may be rectangular, square, hexagonal, and other like shapes, the preferred embodiment is round because of ease of fabrication. Throughout the specification the several parts will be described as being cylindrical, round or annular in shape; however, the invention is not limited to this one shape because manifestly oval or slightly off-circular shapes will be satisfactory. Since circular shapes may be regarded as having an infinite number of sides, the term "polygonal" is used to include all of the shapes mentioned as well as other equivalent shapes.

A neutronic reactor is generally indicated at 10 in Figure 9. Within the reactor 10 a plurality of fuel elements 12 are vertically disposed in spaced relationship with respect to each other for the passage of a liquid coolant (not shown). The lower end of each element 12 has a wedge portion 14 projecting centrally from the undersurface and along the vertical axis thereof. This portion is provided for insertion into a complementary V-shaped bracket 16 in order to retain the lower end of the element 12 in a fixed position within the reactor 10. The upper end of the element 12 includes a hanger 18 by which the element is lowered into position by a crane (not shown) and by which the upper end of the element 12 is sustained in position within the reactor 10. In addition, the upper end of the fuel element 12 extends into a gas collection chamber 20 where gases, such as xenon and krypton, detrimental to the operation of the reactor, are collected during the operation thereof. The manner in which these gases are directed to the chamber 20 will be disclosed hereinafter. Further the liquid coolant in which the elements 12 are immersed enters the reactor 10 at an inlet 22 and rises upwardly to a plenum chamber 24 from which it exits through an outlet 26.

One of the fuel elements 12 is indicated in Figure 1. Essentially, this element consists of a stack of alternate fissionable wafers and supporting and separating wafers, such as and preferably wafers of neutron moderating material, in a sodium-filled tube. In particular it comprises an enclosed tubular jacket 28 of nonfissionable material, i. e., a material not fissionable by thermal neutrons, and preferably of stainless steel. Inasmuch as the majority of the element 12 is immersed in a liquid coolant, the extremities of the jacket 28 are closed by a cap 30 and a base 32 in a fluid-tight manner. The wedge portion 14 at the lower end of the element 12 is integral with the base 32. Near the top of the element 12 the jacket 28 contains a necked portion 34 which (as shown in Figure 9) together with similar portions of adjacent elements 12 facilitate the movement of the liquid coolant within the plenum chamber 24 toward the outlet 26.

Extending upwardly from the top of the cap 30 is the hanger 18 containing a hole 36 by which the element 12 is handled while being placed and removed from the reactor. Within the cap 30 is the upper extremity of an axial bore 38. This bore extends throughout the length of the element 12 from the base 32 to a point within the cap 30 where it communicates with the upper surface of said cap by means of branches 40 and 42. It is through the bore 38 that the fission gases escape from the active portion of the fuel element 12 into the gas collection chamber 20 as alluded to above.

Between the cap 30 and the base 32 are disposed the active portions of the element 12. They comprise a plurality of moderating wafers 44 which extend from the base 32 over a greater portion of the element 12. The particular configuration of the wafer 44 will be described in detail hereinafter. Each wafer 44 supports a wafer 46 containing thermal neutron fissionable material which is preferably a $U^{235}$-enriched uranium body or the like. The stack of moderating wafers 44 support a neutron-reflecting body of moderating material 48. The wafers 44 and the moderating material 48 are preferably composed of beryllium. In turn, above the moderating material 48 is disposed a mass of breeding material 50, such as thorium. Above this is a member 52 of nonfissionable material, such as iron or nickel, mounted within the necked portion 34 adjacent the undersurface of the cap 30.

The wafers 44 together with the moderator 48 and the breeding material 50 are annular to conform with the cylindrical jacket 28. However, the outside diameter of said members and wafers is slightly less than the inside diameter of the jacket 28, whereby an annular space 54 is formed. In addition, the annularity of the aforesaid members and wafers provides a central bore segment 38a which, when aligned, form a continuation of the bore 38. Atop the breeding material 50 is a flat chamber 56 disposed between said material and the member 52. This chamber connects the bore 38 with the annular space 54.

At the lower end of the fuel element 12, the lowermost moderating wafer 44 is supported on the base 32 by means of a plurality of spaced lugs 58 about the periphery of said base to provide a passage 60. In this manner, the lower end of the annular space 54 communicates with the lower extremity of the bore 38.

The detailed configuration of the moderating wafers 44 are shown in Figures 2 and 3. The predominant shape of the wafers 44 is conical with upper and lower surfaces inclined upwardly toward the central bore segment 38a. About the circular periphery of each wafer 44 is disposed a rim 62 extending from the upper surface. In the lower surface about the periphery is a groove 64 having substantially similar radii as the rim 62 and into which the rim of a lower wafer 44 is adapted to fit (Figure 3). In this manner, when the rim 62 is disposed within the groove 64, the lower surface of the upper wafer 44 is spaced from the upper surface of the lower wafer providing an annular conical recess 66 which is partially occupied by the wafer 46. As shown in Figure 4, the wafer 46 is a truncated cone having angles similar to that of the upper and lower surfaces of the wafers 44. On the upper surface of each wafer 44 are disposed a plurality of radial ribs 68 extending from the central bore segment 38a to the lowermost point of the recess 66 (Figure 2). Upon these ribs is disposed the wafer 46.

Figure 6:
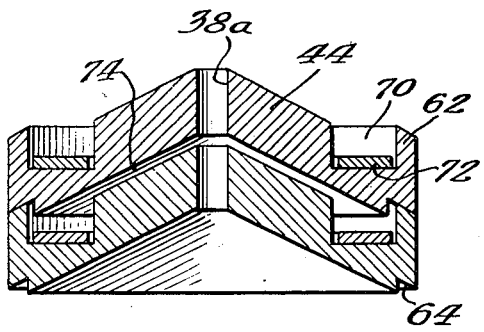
Figure 6 is an enlarged vertical sectional view of the embodiment shown in Figure 5, taken on the line 6—6.

In addition to the embodiments of the wafers 44 and 46 as described with respect to Figures 2, 3 and 4, there are two alternate embodiments which may be substituted for that described. These are the embodiment shown in Figures 5 and 6 and the embodiment shown in Figures 7 and 8. As shown in Figure 6, the predominant shape of the wafer 44 is conical, extending upwardly from the outer periphery to the central bore segment 38a. At the outer periphery are disposed the rim 62 and the groove 64 in a manner similar to that described with respect to the first embodiment shown in Figure 3. This embodiment (Figure 6) differs in that an annular niche or recess 70 is disposed in the upper surface of each wafer 44 adjacent the rim 62. Within each niche 70 is lodged a disc-shaped wafer 72 of fissionable material similar to the wafer 46 of Figure 3. When two wafers 44 are disposed adjacent to each other as shown in Figure 6, the inclined upper surface of the lower wafer is spaced from the inclined lower surface of the upper member, affording a passageway 74 between the annular niche 70 and the bore 38.

Figure 7:
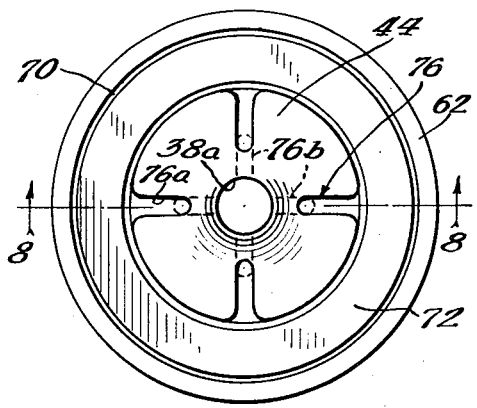
Figure 7 is an enlarged plan view of a third embodiment of the portion of the fuel element shown in Figures 2 and 3.
Figure 8:
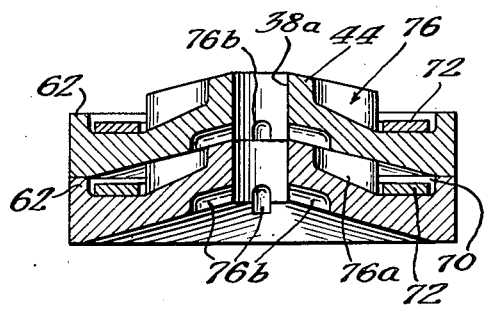
Figure 8 is an enlarged vertical sectional view of the embodiment shown in Figure 7, taken on the line 8—8.

The third embodiment of the moderating wafers 44 is shown in Figures 7 and 8. As in the preceding embodiments, this embodiment is conical. An upper wafer 44 is supported by the peripheral rim 62 of the lower wafer whereby the annular niche or recess 70 of the lower wafer is covered by the upwardly inclined undersurface of the upper wafer. The disc-shaped wafer 72 is lodged within said niche. Communication between the central bore 38 and the niche 70 is provided by means of four radial passageways 76 (Figure 7). Each passageway 74 is composed of a passage segment 76a in the upper surface of a given wafer and of a passage segment 76b in the lower surface of the adjacent upper wafer. The passage segments connect with each other at a point substantially midway between the annular niche 70 and the bore 38.

With respect to the three embodiments of the moderating wafers 44, it is to be noted that the passageway extending to the bore 38 from either the recess 66 of the first embodiment (Figure 3) or the niche or recess 70 of the second and third embodiments (Figures 5 through 8), is inclined upwardly.

*Operation*

In operation it is contemplated that the fuel elements 12 are immersed in a suitable liquid coolant, such as liquid sodium or an alloy of sodium and potassium. This coolant is moved through the reactor 10 by means of a pump (not shown). Within the jacket 28 the assembly is immersed in a thermally conductive liquid 78 (shown in Figure 1 only in the bore 38), such as sodium, to effect a satisfactory heat transfer between the parts. The liquid 78 within the fuel element 12 is relatively stagnant compared to the liquid coolant in which said element is immersed. For this reason, the top level of the liquid 78 can be fixed at a point within the nonfissionable member 52. By virtue of heat of fission, the liquid 78 is circulated by convection upwardly through the bore 38. At the point of juncture of said bore with the radial chamber 56 the liquid 78 moves radially to the annular space 54 through which it moves downwardly, yielding its heat to the jacket 28 which in turn is cooled externally by the liquid coolant, in which the element 12 is immersed. At the lower end of the annular space 54 the liquid 78 passes through the passage 60 to the lower extremity of the bore 38 to renew the cycle. Manifestly, the liquid enters into the recess 66 (Figure 3) between the wafers 44 and around the wafers 46. In this manner, the various parts of the active portion of the fuel element are completely immersed in the liquid coolant 78.

During the operation of the reactor the uranium wafers 46 evolve fission gases, such as xenon and krypton. Bubbles of these gases rise in the liquid coolant 78 and are wafted by the upwardly inclined surface of the upper wafer 44 to the central bore 38. From there they are carried by the liquid 78 to the top level where they continue to rise through the upper extremity of the bore 38 into the gas collection chamber 20.

Another embodiment of the fuel element 12 is indicated in Figures 10, 11 and 12. Outwardly this embodiment has a similar size and configuration as the embodiment indicated in Figure 1. It consists of the enclosed tubular jacket 28 of nonfissionable material, the cap 30, and the base 32 disposed at opposite ends of said jacket in a fluid-tight manner. Likewise, the jacket includes the necked portion 34 which has been previously described with respect to the embodiment shown in Figure 1. In addition, the element 12 is supported by the hanger 18 and the wedge portion 14 which are integral with the cap 30 and the base 32, respectively, as described above.

This embodiment of the fuel element 12 is disposed within the neutronic reactor 10 and is immersed in a liquid coolant (not shown), for example, heavy water. An axial tube 80 is centrally disposed of the element 12 (Figures 10 and 11), extending from the base 32 to the necked portion 34. The lower end of the tube 80 communicates with the lower surface of the base 32 by means of passages 82 and 84 extending through said base, and the upper end of the tube communicates with the outer surface of the jacket 28 and within the necked portion 34 by means of a radial passage 86 (Figure 12). By virtue of the axial tube 80, the liquid coolant in which the element 12 is immersed also passes through the center of said element affording an additional cooling surface.

Between the base 32 and the cap 30 are disposed the active portions of the fuel element. These include (Figure 11) a mass of breeding material 88, such as thorium, resting on the base 32, a neutron-reflecting body 90 of moderating material, such as beryllium, above said mass, and a stack of annular wafers 92 of thermal neutron fissionable material, such as $U^{235}$-enriched uranium or the like. Above the wafers 92 of fissionable material (Figure 10) are disposed a neutron-reflecting body 94 of moderating material, such as beryllium, a mass of neutron-breeding material 96, such as thorium, and a body of nonfissionable material 98, such as nickel, within the necked portion 34. Between the body 98 and cap 30 are disposed a gas trap, generally indicated at 100, and a gas collection chamber 102 separated by a partition 104. Communication between the trap 100 and chamber 102 is attained by means of a number of vertical apertures 106 near the periphery of the partition 104. Since this embodiment is provided with an individual gas storage chamber, the upper end need not be disposed within the gas chamber 20 which is the case with the foregoing embodiments lacking individual chambers, and, as a matter of fact, the reactor can be modified to eliminate gas chamber 20.

The trap 100 is merely a tortuous path disposed between the active portion of the element 12 and the chamber 102 to prevent passage of particles of disintegrated fissionable material. It is composed of an annular member 108 integral with the partition 104 and extending from the undersurface thereof to a point above the top surface of the nonfissionable material 98. Central of the annular member 108 is a tube 110 which extends from above the lower end of said member to the lower surface of the neutron-reflecting body 94. A body of liquid coolant 112 is disposed at the lower end of the trap 100 and the upper surface of the coolant is disposed between the upper end of the tube 110 and the lower end of the annular member 108.

Above the neutron-reflecting body 90 (Figure 11) are stacked the wafers 92 of fissionable material. These are sustained in spaced relationship with regard to each other by means of annular cups 114 made, for example, of nickel or stainless steel. Each cup 114 includes a peripheral support 116 and an inner element 118. The peripheral support 116 of each cup 114 supports a cup above it so that a space 120 is retained between the undersurface of said upper cup and the top surface of the wafer 92 in the lower cup. Inasmuch as the element 118 is shorter than the support 116, the space 120 communicates with an annular passage 122 which is disposed between the cups 114 and the axial tube 80 providing an upwardly extending viaduct that communicates with the tube 110. It is pointed out that the annular passage 122 does not communicate at any point with the inside of the axial tube 80. For this reason, it is possible to fill passage 122 and the spaces 120 between each cup 114 with a liquid coolant 124 (shown in Figure 10 only in the passage 122) for the purpose of achieving a maximum of thermal heat transfer from the wafers 92 to the cooling surfaces. The level of the coolant 124 is fixed at a point below the tube 110.

With prolonged operation fissionable gases, such as xenon and krypton, are generated from the wafers 92 and rise through the coolant 124 out of the space 120 into the annular passage 122. These gases pass through the tube 110 and as the pressure accumulates above the surface of the liquid coolant 112 within the member 108 are forced through the trap 100 from which they pass into the gas collection chamber 102 via the apertures 106.

In operation using this embodiment of fuel element when liquid coolant, other than a good neutron moderator, is passed through the axial tube 80 it is preferred that the fuel element, at least that portion containing the wafers of thermal neutron fissionable material, be surrounded by a solid neutron moderator, e. g., by a jacket of beryllium.

Since certain changes can be made in the foregoing embodiments of the present invention, it is intended that all matter shown in the accompanying drawings and description shall be interpreted as illustrative only and may be modified without departing from the intended scope of the invention.

What is claimed is:

1. A fuel element for a neutronic reactor comprising an elongated cylinder of nonfissionable material, a mass of neutron moderator within the cylinder having a plurality of recesses therein, and thermal neutron fissionable material in each recess, the mass having an elongated passage connecting each recess to the surface of the mass whereby gases generated by fission escape through said passage.

2. A fuel element for a neutronic reactor comprising a tubular jacket of nonfissionable material, a mass of neutron moderator within the jacket having a plurality of recesses therein, and a body containing thermal neutron fissionable material in each recess, the moderator having a longitudinal passage, each recess being in communication with the passage whereby gases generated by fission escape through said passage.

3. A fuel element for a neutronic reactor comprising a tubular jacket of nonfissionable material, a plurality of neutron moderator bodies stacked within the jacket, having substantially central alignable apertures, and each body having a recess about the aperture in one surface, said surface of each moderator body being conical between the recess and the aperture, the other surface of each moderator body being parallel with said one surface, said other surface being spaced from said one surface of the lower moderator, and a wafer containing thermal neutron fissionable material disposed on each one surface, the jacket being adapted to contain a thermal conductive liquid immersing the moderator bodies and wafers to establish a thermal bond therebetween, whereby gases generated by fission escape through the aperture.

4. A fuel element for a neutronic reactor comprising a jacket of nonfissionable material, a plurality of polygonal neutron moderator bodies stacked within the jacket and having substantially central alignable apertures, each moderator body having a recess about the aperture in one surface, the other surface of each moderator being parallel with said one surface, said other surface being spaced from said one surface of the lower moderator, and a wafer of thermal neutron fissionable material in each recess, the jacket being adapted to contain a thermally conductive liquid immersing the moderator bodies and the wafers to establish a thermal bond therebetween, whereby gases generated by fission escape through the aperture.

5. A fuel element for a neutronic reactor comprising a jacket of nonfissionable material, a plurality of annular neutron moderator bodies stacked within the jacket forming a substantially axial bore, each moderator body having an annular recess about the bore, and a wafer of thermal neutron fissionable material in the recess, the jacket being adapted to contain a thermally conductive liquid immersing the moderators and wafers, each moderator body also having first and second surfaces being parallel and conical, the second surface of the moderator body being spaced from the first surface of the moderator body below it to provide a passage, whereby gases generated by fission escape through said passage.

6. A fuel element for a neutronic reactor comprising a jacket of stainless steel, a plurality of annular beryllium members stacked within the jacket so as to form an axial bore, each member having an annular recess about the bore, and an annular body containing uranium in the recess, the jacket being adapted to contain liquid sodium immersing the members and bodies, each member also having first and second surfaces being parallel and conical, the second surface of one member being spaced from the first surface of the member below it to provide a passage, whereby gases generated by fission escape through said passage.

7. A fuel element for a neutronic reactor comprising a jacket of nonfissionable material, a plurality of annular neutron moderator bodies stacked within the jacket forming a substantially axial bore, each moderator body having a peripheral rim on one surface, each body also having a peripheral groove on the other surface registerable with the rim of a moderator body adjacent it, said one surface of each body being convexly conical from the rim to the aperture, and a wafer of thermal neutron fissionable material on the one surface of each moderator body, the other surface of one moderator being spaced from the wafer on the one surface of the moderator adjacent it to provide a passage, whereby gases generated by fission escape through said passage, the jacket being adapted to contain a thermally conductive liquid immersing the moderator bodies and the wafers.

8. A fuel element for a neutronic reactor comprising a jacket of nonfissionable material, a plurality of annular neutron moderator bodies stacked within the jacket forming a substantially axial bore, each moderator body having a peripheral rim on the one surface and a peripheral groove on the other surface registerable with the rim of a moderator body adjacent it, the surfaces of the moderators being conical, a wafer of neutron fissionable material having the shape of a truncated cone disposed on the one surface of each moderator, the other surface of one moderator being spaced from the wafer on the moderator adjacent to it, a reflector body of annular neutron moderator adjacent to the stacked moderator bodies, and a mass of annular neutron breeding material adjacent to said reflector body, the jacket being adapted to contain a thermally conductive liquid.

9. A fuel element for a neutronic reactor comprising a jacket of nonfissionable material, a plurality of annular beryllium members stacked within the jacket forming an axial bore, the portion of each member between the periphery and the bore being spaced from the adjacent members, said portion being convexly conical, a wafer of thermal neutron fissionable material having the shape of a truncated cone disposed on a portion of the cone, an annular reflector body of neutron moderator adjacent to the stacked moderator bodies and an annular mass of neutron breeding material adjacent to said reflector body, the jacket being adapted to contain a thermally conductive liquid.

10. An article of manufacture comprising a polygonal member of a neutronically efficient neutron-moderating material having an annular recess and a substantially central aperture in one surface, and also having parallel, conical surfaces.

11. An article of manufacture comprising a beryllium wafer having an annular recess in one surface, the wafer having a central aperture, and also having parallel, conical surfaces.

References Cited in the file of this patent
FOREIGN PATENTS 630,726     Great Britain _____ Mar. 30, 1936